UNITED STATES PATENT OFFICE.

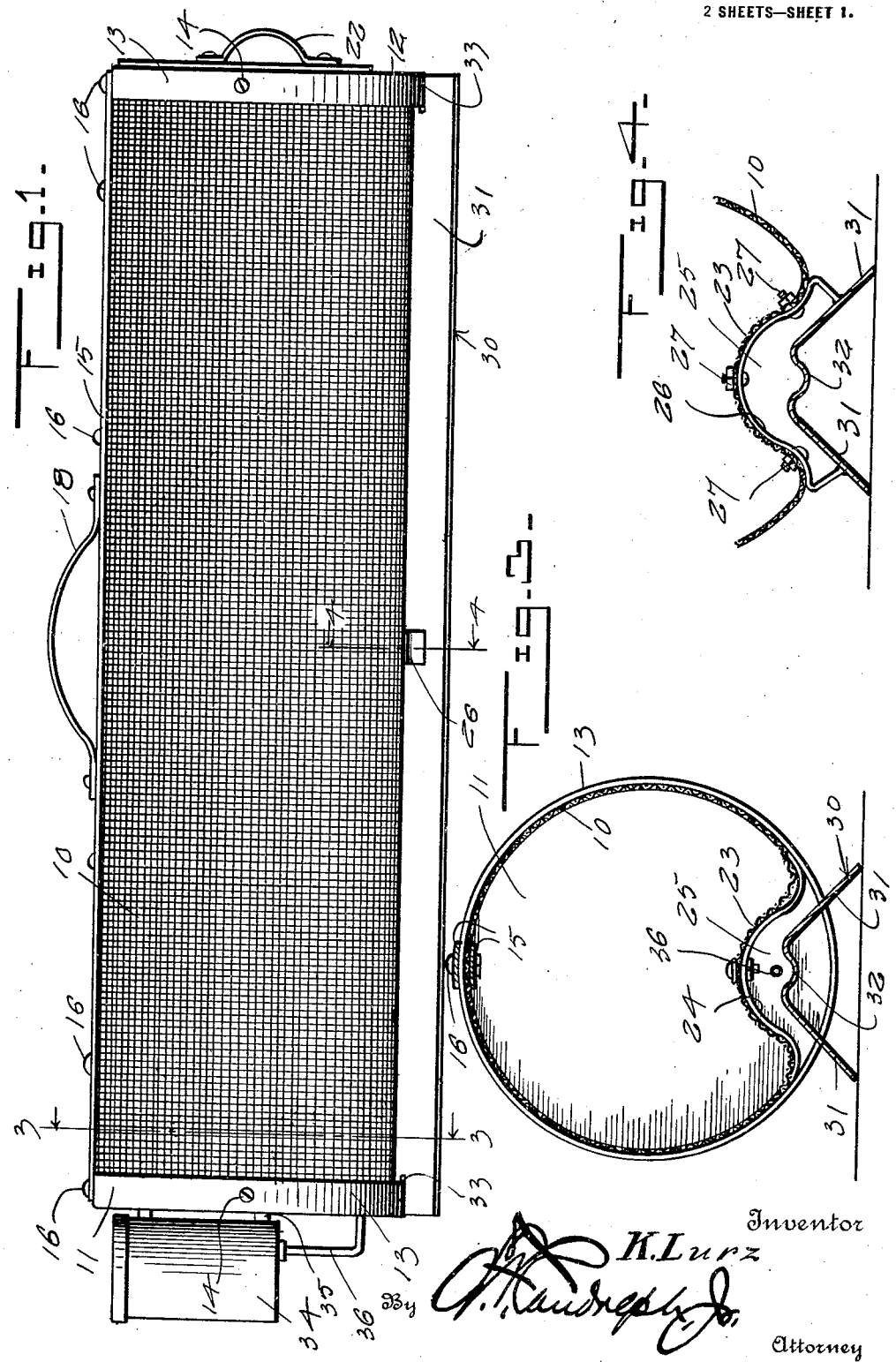

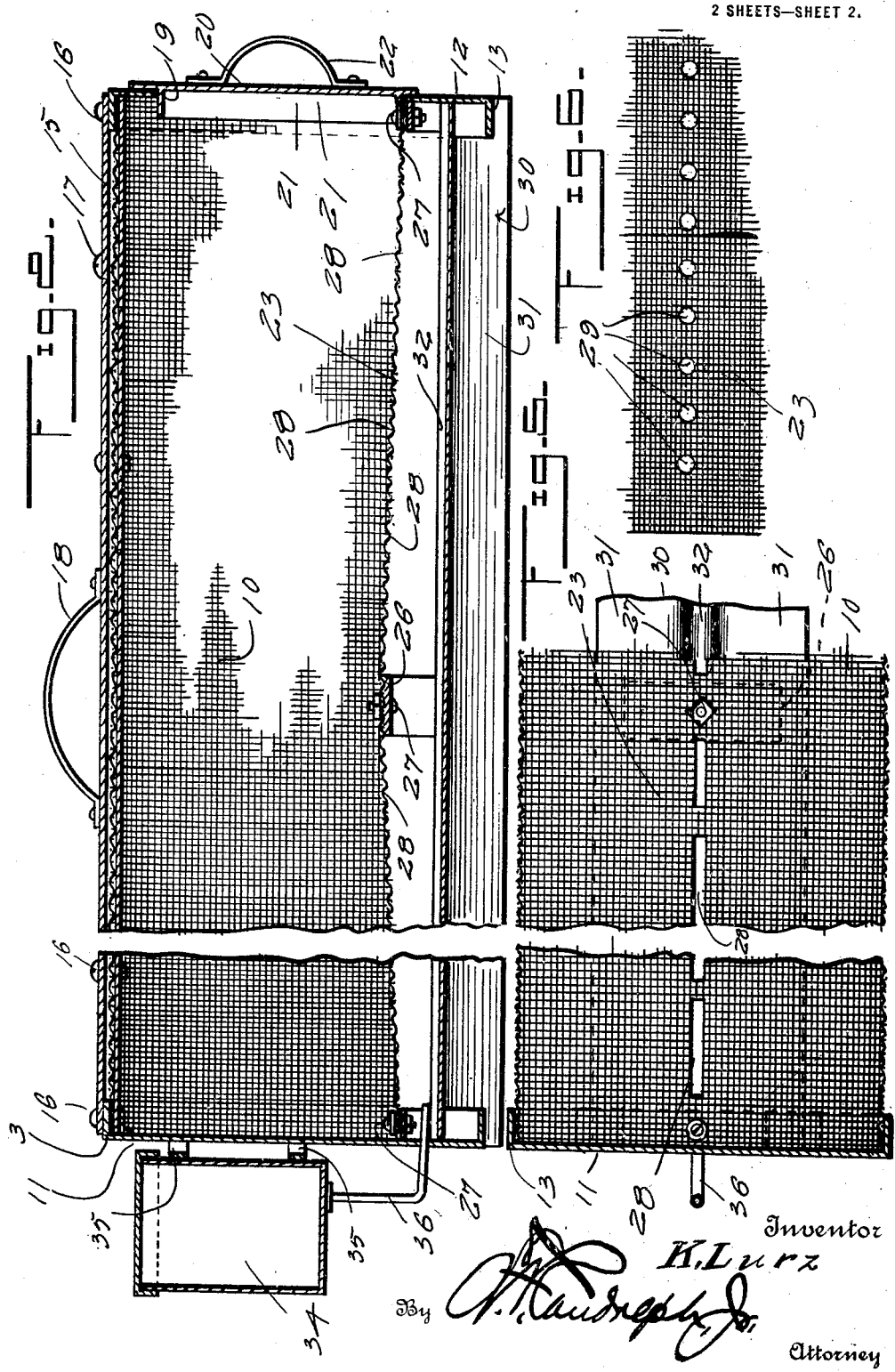

KARL LURZ, OF WALL, SOUTH DAKOTA.

FLYTRAP.

1,320,017. Specification of Letters Patent. Patented Oct. 28, 1919.

Application filed October 29, 1918. Serial No. 260,158.

*To all whom it may concern:*

Be it known that I, KARL LURZ, a citizen of the United States, residing at Wall, in the county of Pennington and State of South Dakota, have invented certain new and useful Improvements in Flytraps; and I do hereby declare the following to be a full, clear, and exact description of the invention, such as will enable others skilled in the art to which it appertains to make and use the same.

This invention is an improvement in traps, and has particular reference to a fly trap.

An object of the invention is to provide a trap of simple and inexpensive construction wherein effective means are provided for attracting the flies and other insects to the trap and entrapping the same therein.

Another object is the provision of a trap, the body portion of which is of a novel formation and has a trough member associated therewith and adapted to contain a liquid utilized for attracting the insects to the immediate vicinity of the trap.

The inventive idea involved is capable of receiving a variety of mechanical expressions, some of which, for the purpose of illustrating the invention, are shown in the accompanying drawings, wherein:

Figure 1 is a side elevation of the trap constructed in accordance with the invention, Fig. 2 is a vertical longitudinal section therethrough, Fig. 3 is a transverse section on the line 3—3 of Fig. 1, Fig. 4 is a similar section on the line 4—4 of Fig. 1, Fig. 5 is a fragmentary horizontal section, showing one method of constructing the bottom of the body portion of the trap, and Fig. 6 is a fragmentary view of the bottom of the body portion, showing a different form for constructing the same.

Referring particularly to Figs. 1 to 5 inclusive, there is illustrated what is now believed to be the preferred form of the invention, which comprises a foraminous body portion 10, made of wire mesh, cylindrical in form, although it may be understood that the same may be given any other suitable configuration. The ends of the body portion are closed by means of the end plates 11 and 12, each of which is provided with an annular flange 13, inwardly directed to receive the ends of the body portion and secured thereto by means of suitable fasteners, such as small bolts 14, and in order that the body portion may be suitably reinforced and the ends 11 and 12 braced there is provided a pair of elongated reinforcing and bracing strips 15, between which the upper portion of the body is secured, and the ends of said strips are secured to the flanges 13 by means of small bolts 16, while the strips are further secured to the body 10 by means of similar fasteners 17, extended therethrough. The uppermost strip 15 is preferably provided intermediate its ends with a handle 18, whereby the trap may be readily conveyed from one place to another. The end 12 of the trap is provided with an outlet opening 19, preferably arranged eccentrically with respect to said end, and which opening is normally closed by a removable door or closure 20, having an inwardly extending annular flange 21 engageable with the edge of the opening, and also having a handle 22, whereby the closure may be readily removed and replaced.

The wire mesh forming the bottom of the body portion is bent and curved inwardly and upwardly, as indicated at 23, and is supported in such position by means of the end supporting strips 24, having their ends secured to the flanges 13 of the end plates 11 and 12 in any preferred manner, and these end supporting strips 24 are arched, as shown, to conform to the contour of the portion 23, which provides a recess 25 therebelow, for a purpose which will presently appear. Intermediate the ends of the portion 23 the same is further supported by an intermediate strip 26, secured to said portion by the fasteners 27 and curved substantially the same as the end strips 24. As shown in Fig. 5, the top of the portion 23 is provided throughout its entire length with spaced slots 28, forming inlet openings through which the flies will crawl into the interior of the body portion 10. In Fig. 6, the portion 23 is shown as provided with circular openings 29, arranged at intervals along the same.

Preferably disposed beneath the bottom 23 of the body portion 10 is a trough member 30, formed of a single sheet of material, such as metal, and bent to provide the upwardly converging sides 31, the lower edges of which form a support for the trap, while the upper portion thereof projects into the recess 25, so as to be disposed in close proximity to the inlet openings 28 and 29. The upper part of the trough is further bent to provide the longitudinally extending groove 32, adapted to contain a suitable liquid, which is supplied thereto in a manner which will presently appear, and which is adapted to attract the flies to the vicinity of the trap, after which the same will pass through the inlet openings into the body portion thereof. The ends of the sides 31 of the trough member 30 are provided with longitudinally extending slots 33 for receiving the flanges 13 of the adjacent end plates, and the intermediate supporting strip 26 has its ends bent in a downwardly converging direction and at right angles to the sides 31 to which the same are secured in any preferred manner, as by solder.

The means for supplying a constant flow of liquid to the groove 32 of the trough member preferably comprises a supply tank or reservoir 34, secured to the end plates 11 by brackets 35, and having depending from the bottom thereof an angular feed pipe 36, the free end of which is extended through the end plate 11, adjacent its bottom, and that portion of the feed pipe disposed within said end plate is arranged in overhanging relation with respect to the groove 32, whereby the liquid will drip from the pipe into said groove and be contained therein.

What is claimed is:

1. A trap of the class described comprising a foraminous body having its bottom provided with an inwardly directed portion having openings therein, end plates for the body, a removable closure mounted in one of said plates, a trough disposed beneath said inwardly directed bottom of the body, means securing the body to said end plates and to said trough, and a liquid supply reservoir carried by one of the end plates for feeding a liquid to said trough.

2. A trap of the class described comprising a body having its bottom provided with an inwardly directed portion having inlet openings therein, said inwardly directed portion forming a recess, end plates closing the ends of said body portion, and a trough member arranged below said body portion and connected to said end plates and having sides forming a support for the body portion and also having a liquid receiving groove disposed in the recess formed by the inwardly directed bottom of the body.

In testimony whereof I affix my signature in presence of two witnesses.

KARL LURZ.

Witnesses:
W. H. MILLER,
J. P. THOMA.

Copies of this patent may be obtained for five cents each, by addressing the "Commissioner of Patents, Washington, D. C."